F. O. WELLS.
CHUCK ATTACHMENT FOR MACHINE TOOLS.
APPLICATION FILED MAR. 24, 1906.
987,659.
Patented Mar. 21, 1911.
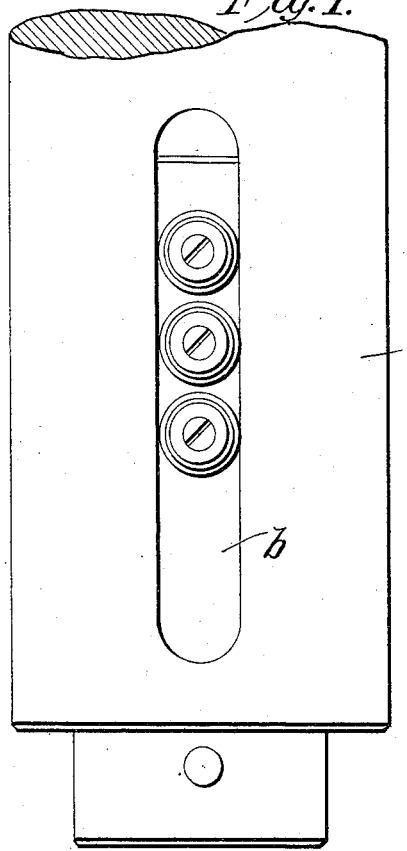
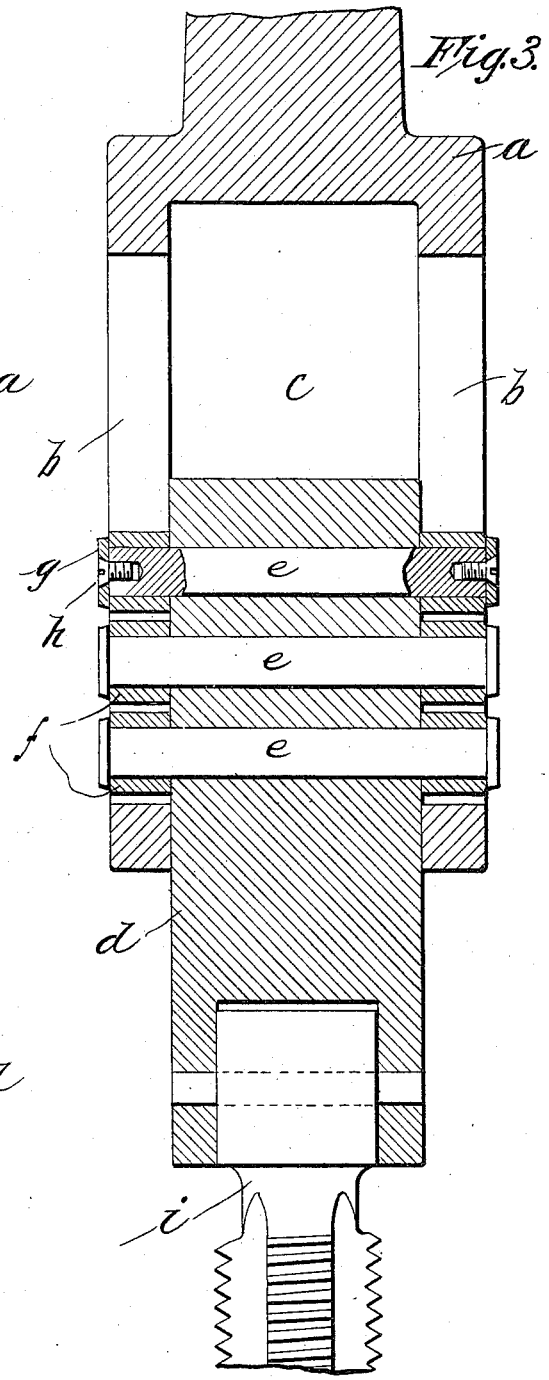
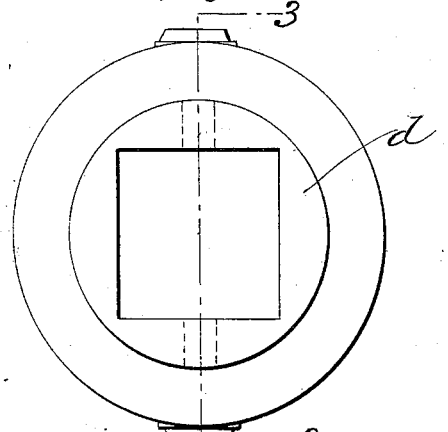
Witnesses:
H. L. Sprague
E. H. Seaholm
Inventor:
Frank O. Wells.
by Chapin & Co.
Attorneys.

UNITED STATES PATENT OFFICE.

FRANK O. WELLS, OF GREENFIELD, MASSACHUSETTS, ASSIGNOR TO WELLS BROTHERS COMPANY, OF GREENFIELD, MASSACHUSETTS, A CORPORATION.

CHUCK ATTACHMENT FOR MACHINE-TOOLS.

987,659.     Specification of Letters Patent.     Patented Mar. 21, 1911.

Application filed March 24, 1906. Serial No. 307,860.

*To all whom it may concern:*

Be it known that I, FRANK O. WELLS, a citizen of the United States of America, residing at Greenfield, in the county of Franklin and State of Massachusetts, have invented new and useful Improvements in Chuck Attachments for Machine-Tools, of which the following is a specification.

This invention relates to means for connecting a chuck-spindle with the spindle of a drilling machine or other tool in such a manner that the chuck-spindle can be moved relative to the operating spindle of the machine, the purpose of which is to allow an automatic relative movement between the two spindles when being used with a tap or other threading tool when work is being performed at considerable distance from the end of the spindle.

Broadly, the invention consists in providing an anti-friction connecting device between the chuck element and the operating spindle of the machine whereby the same can have easy longitudinal movement on the spindle.

In the drawings forming part of this application,—Figure 1 is a side elevation of the lower or outer end of the spindle showing a portion of the movable chuck and the anti-friction devices mounted therein. Fig. 2 is a bottom plan view of Fig. 1. Fig. 3 is a vertical longitudinal section on the line 3—3, of Fig. 2.

Referring to the drawings in detail, $a$ designates the operating spindle of the machine; $b$ designates longitudinal slots cut in, and opening into, the lower end $c$ of the spindle.

$d$ designates the chuck-spindle shown circular in cross section but may be of any other suitable form and adapted to fit the lower end $c$ of the spindle $a$. Passing through the upper end of the chuck-spindle $d$ are shafts $e$ securely held in the spindle $d$ by being driven tightly into the holes shown passing therethrough. Located on the outer end of the shafts $e$ are anti-friction rollers $f$ which are adapted for rotation on the ends of the shafts $e$ and are secured to the same by means of the washers $g$ which are held in place by means of the screw $h$ or other suitable means. It will be noticed that these rollers $f$ are substantially the same in diameter as the width of the longitudinal slots $b$ in the spindle $a$ and are adapted to have rolling contact with the sides of the slots $b$ when in use, and also serve to transmit the driving-effect from the spindle $a$ to the chuck $d$.

$i$ designates a tap secured to the lower end of the chuck-spindle $d$ in the ordinary manner, although it is understood that a drill, reamer, or other tool may be substituted therefor.

By the use of the chuck-spindle $d$ it is easy to drill, tap, or take a finishing cut in holes of great depth which allows a relative movement between the two spindles.

The spindle $a$ it is understood is adapted to be fed downward toward the work being operated upon in the ordinary manner, as by means of a hand-lever which is commonly used when the tool used is a drill, reamer, or other tool that is not self-feeding, or the spindle $d$ may be fed downward by hand or by means of a hand-lever as is usual in machine tools of various kinds.

The anti-friction rolls $f$ permit an easy vertical movement of the chuck-spindle $d$ relative to the operating spindle $a$ in tapping, drilling, or cutting long holes.

I have found that by the employment of this means of connecting a drill, tap, reamer or whatever tool, to the spindle of the machine, the tool is less liable to be broken than in the usual manner of operating such tools as when the same is attached directly to the operating spindle $a$. This connecting means between the chuck and spindle permits the operator to readily insert the tool within a piece of work by sliding the chuck part on the spindle and then extending the same when the tool is applied to the work.

Having thus described my invention, what I claim and desire to secure by Letters Patent of the United States, is:—

1. As an improvement in means for attaching a tool-chuck to an operating spindle, the spindle having a series of longitudinal slots herein opening into a hollow portion thereof, a tool-chuck, anti-friction devices carried thereby and engaging the slots of the spindle, the main portion of the chuck engaging the hollow portion of the spindle, as described.

2. As an attachment to the operating spindles for machine tools having parallel longitudinal slots in the end of the same for receiving anti-friction devices, and provided with a limiting shoulder at each end of the same, a chuck spindle supporting said anti-friction devices and secured to the end of the operating spindle and adapted to be alined with the longitudinal slots in the spindle which carry the anti-friction means, whereby the chuck-spindle may have free longitudinal movement in the operating spindle, the operating spindle being a one piece element.

3. As an improvement in means for attaching a chuck to the operating spindle, comprising, a series of slots in the spindle, a series of shafts carried by the chuck, anti-friction devices mounted on the shafts and engaging the slots, whereby relative movement of the chuck and spindle is obtained.

4. The construction with a slotted spindle, a chuck element $d$ adapted for reciprocation therein, said chuck element having a series of transversely located shafts $e$, and rollers $f$ thereon, engaging the slots of said spindle, substantially as described.

FRANK O. WELLS.

Witnesses:
EDWARD BLAKE, Jr.,
THOMAS L. COMSTOCK.